(12) United States Patent
Wong

(10) Patent No.: US 11,414,116 B1
(45) Date of Patent: Aug. 16, 2022

(54) GAS CYLINDER LIFTING CART

(71) Applicant: Valtra Inc., Santa Fe Springs, CA (US)

(72) Inventor: Harry Wong, Pasadena, CA (US)

(73) Assignee: Valtra Inc., Santa Fe Springs, CA (US)

( * ) Notice: Subject to any disclaimer, the term of this patent is extended or adjusted under 35 U.S.C. 154(b) by 0 days.

(21) Appl. No.: 17/342,972

(22) Filed: Jun. 9, 2021

(51) Int. Cl.
*B62B 3/10* (2006.01)
*B62B 5/00* (2006.01)
*B62B 5/04* (2006.01)
*B62B 3/04* (2006.01)

(52) U.S. Cl.
CPC ............... *B62B 3/104* (2013.01); *B62B 3/04* (2013.01); *B62B 5/0006* (2013.01); *B62B 5/04* (2013.01)

(58) Field of Classification Search
CPC .......... B62B 3/104; B62B 3/04; B62B 5/0006
See application file for complete search history.

(56) References Cited

U.S. PATENT DOCUMENTS

| 4,753,445 | A | | 6/1988 | Ferrare | |
|---|---|---|---|---|---|
| 5,071,148 | A | * | 12/1991 | Salvucci, Sr. | ............ B62B 1/264 280/47.24 |
| 5,658,118 | A | * | 8/1997 | Luca | ................ B62B 5/06 414/444 |
| 6,224,071 | B1 | | 5/2001 | Dummer | |
| 6,799,769 | B2 | | 10/2004 | Ziolkowski | |
| 7,431,314 | B2 | * | 10/2008 | Donaldson | ............ B60B 29/002 280/47.27 |
| 8,262,108 | B2 | | 9/2012 | Al-Hasan | |
| 9,310,022 | B2 | * | 4/2016 | Sakaguchi | ............ F17C 13/084 |
| 10,173,704 | B2 | * | 1/2019 | Jones | ....................... B65G 7/08 |
| 10,525,997 | B1 | * | 1/2020 | Su | .............................. B62B 1/14 |
| 2002/0067983 | A1 | * | 6/2002 | McGill | ...................... B66F 9/06 414/634 |
| 2003/0151218 | A1 | * | 8/2003 | Swaffield | ................. B62B 3/104 280/47.27 |
| 2004/0076501 | A1 | * | 4/2004 | McGill | ...................... B66F 9/12 414/444 |
| 2010/0021275 | A1 | * | 1/2010 | Ratermann | ................ B62B 1/14 414/454 |
| 2011/0318149 | A1 | * | 12/2011 | Barnes | ....................... B62B 3/02 414/469 |
| 2017/0101119 | A1 | * | 4/2017 | Collins | ....................... B62B 3/02 |
| 2019/0092210 | A1 | * | 3/2019 | Marcusen | ................ B62B 3/104 |

* cited by examiner

*Primary Examiner* — Brian L Swenson
(74) *Attorney, Agent, or Firm* — Jen-Feng Lee, Esq.

(57) ABSTRACT

Present invention relates to gas cylinder lifting cart having a base frame, a long bar, a keeper bar where the cylinder can be held securely during transport by friction pads on holding brackets, with at least a caster wheel providing easy steering. The keeper bar provides open access to put on a gas cylinder, instead of the hassle, and inherent danger, of lifting a gas cylinder vertically up and down to put on the cart. The base frame has a slight bent angle to facilitate easy tilting towards a slant angle for transport.

8 Claims, 5 Drawing Sheets

GAS CYLINDER LIFTING CART

FIELD AND BACKGROUND OF THE INVENTION

Lifting carts for heavy cylinders, such as compressed air cylinders, gas cylinders, are available on the market for quite a while. However, some require lifting up a gas cylinder vertically and putting down the gas cylinder vertically back down into a "ring" type bracket for a secured hold; some require placing and tightening a strap on a gas cylinder for a secure hold. These available products are not convenient for use in work places.

Present invention discloses and claims a simple structure with high degree of flexibility and convenience to safely lift, move, place and otherwise transport, or even store, gas cylinders.

One of the key benefits of present invention, as will be made clear in later sections, is that the holding brackets have friction pads that can hold a gas cylinder in a vertical fashion without a contact support point at the bottom of a gas cylinder.

The use of one or more caster wheels, with brake mechanism, further adds to the ease of steering, swiveling and overall control.

Some major different features and implementations on prior art patents are briefly discussed herein.

1. U.S. Pat. No. 4,753,445; I/D: Jun. 28, 1988; Inventor: Ferrare

The Ferrare 445 patent requires a gas cylinder to be vertically lifted up and placed down (also vertically) to the cart, and secured by two horizontal bands 14 and 16. The weight of the gas cylinder is supported by portions 68, below the lower band 16.

See FIGS. 1 and 2 for such construction of the bands and bottom support. See 4:20-23 for the two bands 14 and 16 (restricting the gas cylinder's placement via vertical up-and-down). See 4:28-31, re bottom of a gas cylinder resting on supporting portions 68.

The "vertical up-down" requirement of putting a gas cylinder onto the cart is simply not a desirable feature, and is in fact one problem the present application intends to overcome.

The support portions 68 are also the direct opposite of present invention where a bottom support is not needed when the brackets-with-friction-pads of present inventions works to hold the weight of a gas cylinder without such support at the bottom.

2. U.S. Pat. No. 5,658,118; I/D: Aug. 19, 1997; Inventor: Luca

The Luca 118 patent uses a strap 76 to secure a gas cylinder, as well as a hook 60 to engage an aperture 62 on the top portion of a gas cylinder.

See 3:64-66 re the hook/aperture description; see 4:14-17 re the strap to encircle a gas cylinder. FIG. 1 also shows these features.

Present invention uses a keeper bar, along with the bracket-with-pads features, to secure a gas cylinder, completely different from the hook/strap features in Luca 118.

3. U.S. Pat. No. 6,224,071; I/D: May 1, 2001; Inventor Dummer

The Dummer 071 has a "T" handle 50 that connects to a caster wheel 38 at the bottom. The gas cylinders (two of them) are secured by a Safety Chain 60. There is no way to change/adjust the angle of a cylinder being transported; the rack 18 (upon which a gas cylinder is rested) is set for to a fixed angle.

See FIGS. 1 and 2 re the "T" handle 50's construction. See 3:60-61 re the rack 18 angle. See 4:54-55 re "passing safety chain 60 around" the gas cylinder.

The present invention's keeper bar and the bracket-with-pads feature is completely different from Dummer 071, in addition to the completely different main carriage structure, including the feature of Dummer 071's handle bar connected to a caster wheel.

4. U.S. Pat. No. 6,799,769; I/D: Oct. 5, 2004; Inventor Ziolkowski

Ziolkowski 769 uses a cross member 24 (with a curve) and a strap 26 to encircle a gas cylinder. It uses two flanges 48a/48b to support the weight of a cylinder.

See FIG. 2 to see the elements of cross member 24, strap 26 and flanges 48a/48b. See 3:38-42 re the strap 26 and cross member 24 to secure the gas cylinder. See 5:5-6 re the two support flanges 48a/48b at the bottom of vertical support members 14a/14b.

Ziolkowskie lacks the bracket-with-pads feature to secure a gas cylinder as taught in present application.

5. U.S. Pat. No. 8,262,108; I/D Sep. 11, 2012; Inventor: Al-Hasan

Al-Hasan 108 uses a base member 24 to support the weight of a gas cylinder. To secure a gas cylinder, it relies on an upper C-shaped member 38, a lower C-shaped member 40 and a belt 62. In addition, three caster wheels are located at three external points under the main body.

See FIG. 1 re the layout of the three caster wheels, support member 24, the 2 C-shaped members 38/40, and the strap 62. See 4:7-9 re the 2 C-shaped members; see 3:56-57 re the three casters 28 disposed at the outer extremes of the base assembly.

The mechanism of telescoping tubes (29/31) to effectuate the upward extension of the frame is completely missing in present invention.

SUMMARY OF THE INVENTION

The invention relates to a lifting and transporting cart for heavy cylinders, such as compressed gas cylinders. The cart has a long bar rotatable on a base frame, with a keeper bar that can be easily swung down to "lock" a gas cylinder in place.

The base frame is substantially in a U shape, like the letter U. From the U-tip it has two extending arms. A metal tube connects the two extending arms in their middle potions.

On top of the long bar is a handle.

A cylindrical tube is at a lower distal end of the long bar. A shaft is received inside said cylindrical tube, with the shaft's two ends received into a first tube and a second tube on the two extending arms.

The lifting cart further has a rigid plate that's generally in a bent shape; its lower end connects to a lower distal end of the long bar and its upper end connects to a middle portion of the long bar.

The long bar has an upper v-shaped bracket and a lower v-shaped bracket.

A keeper bar has one end rotatably connected to an upper point on the long bar; a center v-shaped bracket is on the other end of the keeper bar.

The upper v-shaped bracket, the lower v-shaped bracket and the center v-shaped bracket all have two friction pads for contacting the outside surface of a gas cylinder held by the lifting cart. The friction pads are made from materials with high coefficient of friction on metal to generate the desired friction contact between the pads and a gas cylinder, sufficient to resist the gravitational pull by the weight of a cylinder when held upright without support from the bottom.

The gas cylinder lifting cart has two wheels on the two sides of the two extending arms and at least one caster wheel near the center of the of the U-shaped base frame.

Generally, the long bar, the base frame, the tube, the keeper bar, the handle, and the metal plate can be made by metal. But other suitable and sturdy materials can be used as long as those materials provide the requisite structure strength for the purpose holding and moving, transporting a gas cylinder, compressed air cylinder, or similarly weighted products.

DESCRIPTION OF THE DRAWINGS

The accompanying drawings exemplify the preferred embodiments of the invention. Together with the description, serve to explain the principles of the invention.

A brief description of the drawings is as follows.

DETAILED DESCRIPTION OF THE PREFERRED EMBODIMENT

Figure 1:
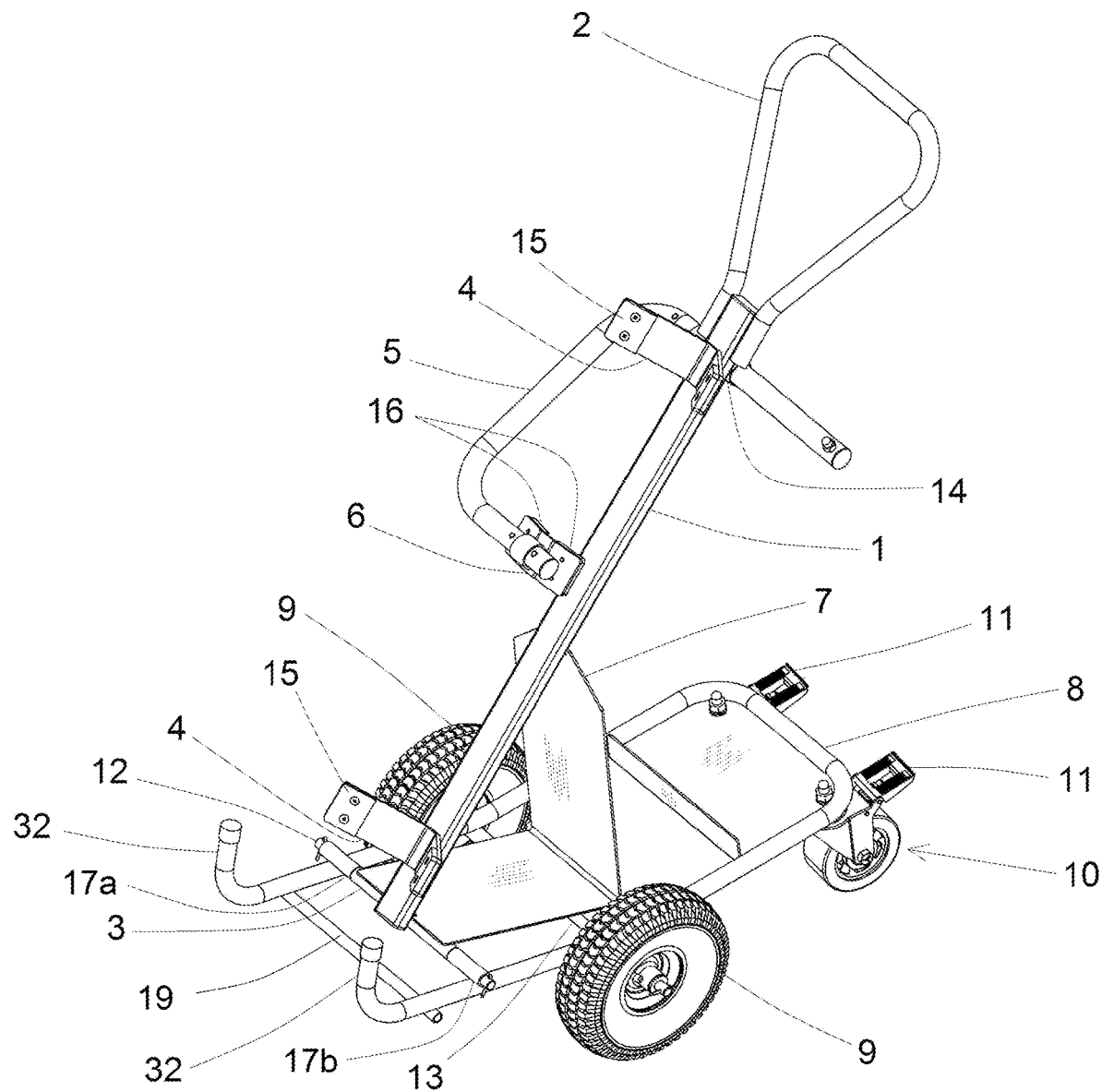
FIG. 1 is the perspective view of the cart of present invention.

As shown in FIG. 1, the primary structure of the present invention is comprised of a substantially U-shaped base frame 8 having two extending arms (the letter U's shape has two extending arms), a metal tube 13 connecting the two extending arms, and a long bar 1.

A base frame 8 shaped like a 3-sided square, instead of round angles like a U, will certainly work and perform the same function.

The metal tube 13 connects the two extending arms in their middle portions.

Figure 2:
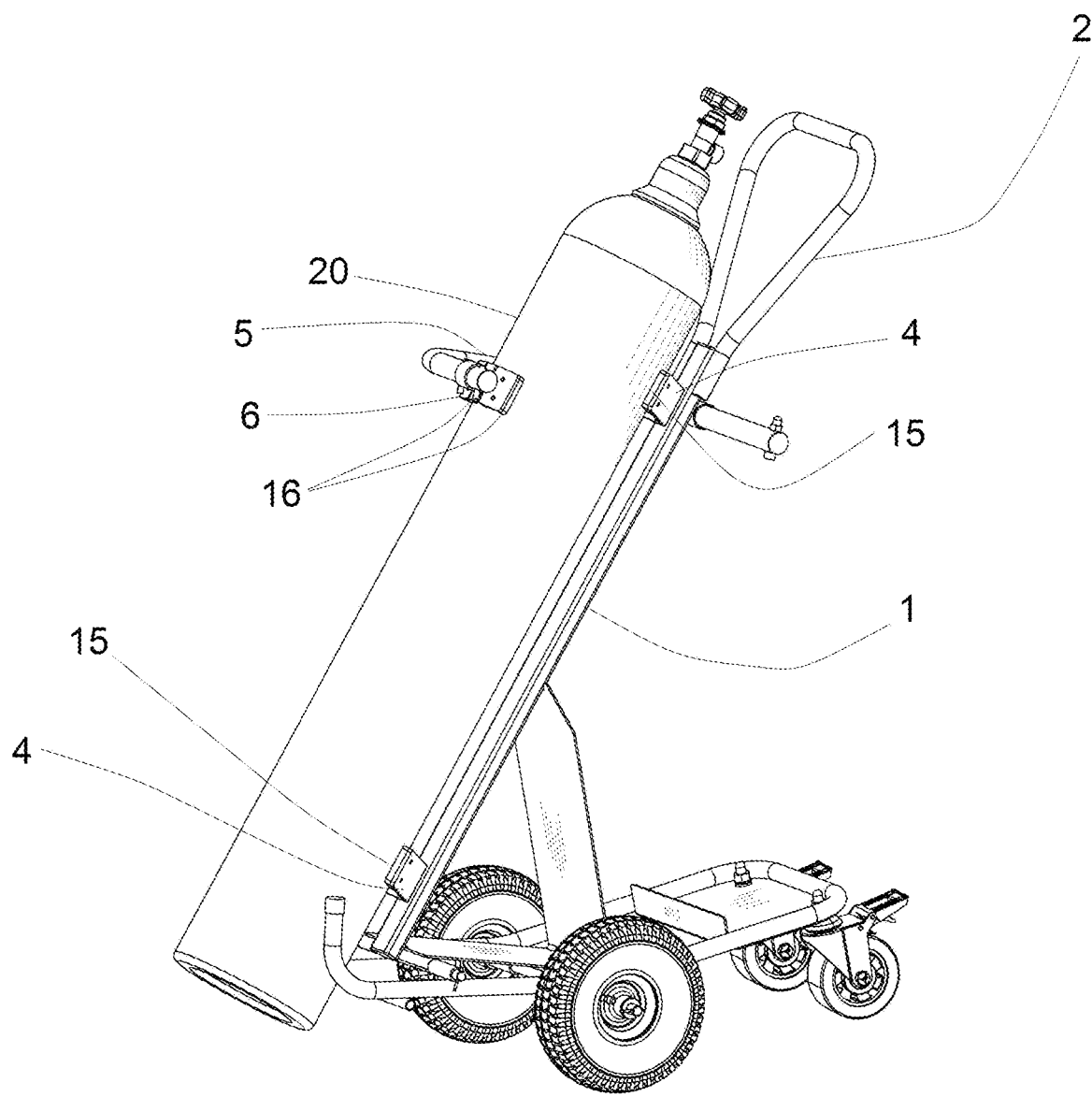
FIG. 2 is the perspective view of the cart of present invention with a gas cylinder being held in a ready to transport configuration.

A handle 2 is formed on an upper distal end of the long bar 1. The handle 2 can be a triangular shape, as shown in FIGS. 1 and 2, or any other shape as long as it is good for holding or handling by human hands. The combined length of long bar 1 and handle 2 should be long enough to accommodate the longest gas cylinder 20.

A cylindrical tube 3 is at a lower distal end of the long bar 1. The cylindrical tube 3 is generally in a horizontal orientation. These parts stated so far generally are made from metal materials, such as steel. Cylindrical tube 3 can be welded to the long bar 1.

A shaft 12 is received inside said cylindrical tube 3, with the shaft 12's two ends received into a first tube 17*a* and a second tube 17*b* on the two extending arms. First tube 17*a* and second tube 17*b* can be welded on the base frame 8, each on an extending arm.

The lifting cart further has a metal plate 7 that is generally in a bent shape, or L shape if stated colloquially, as shown in FIGS. 1-4. The metal plate 7 has a lower end connected to a lower distal end of the long bar 1 and an upper end connected to a middle portion of the long bar 1.

Figure 3:
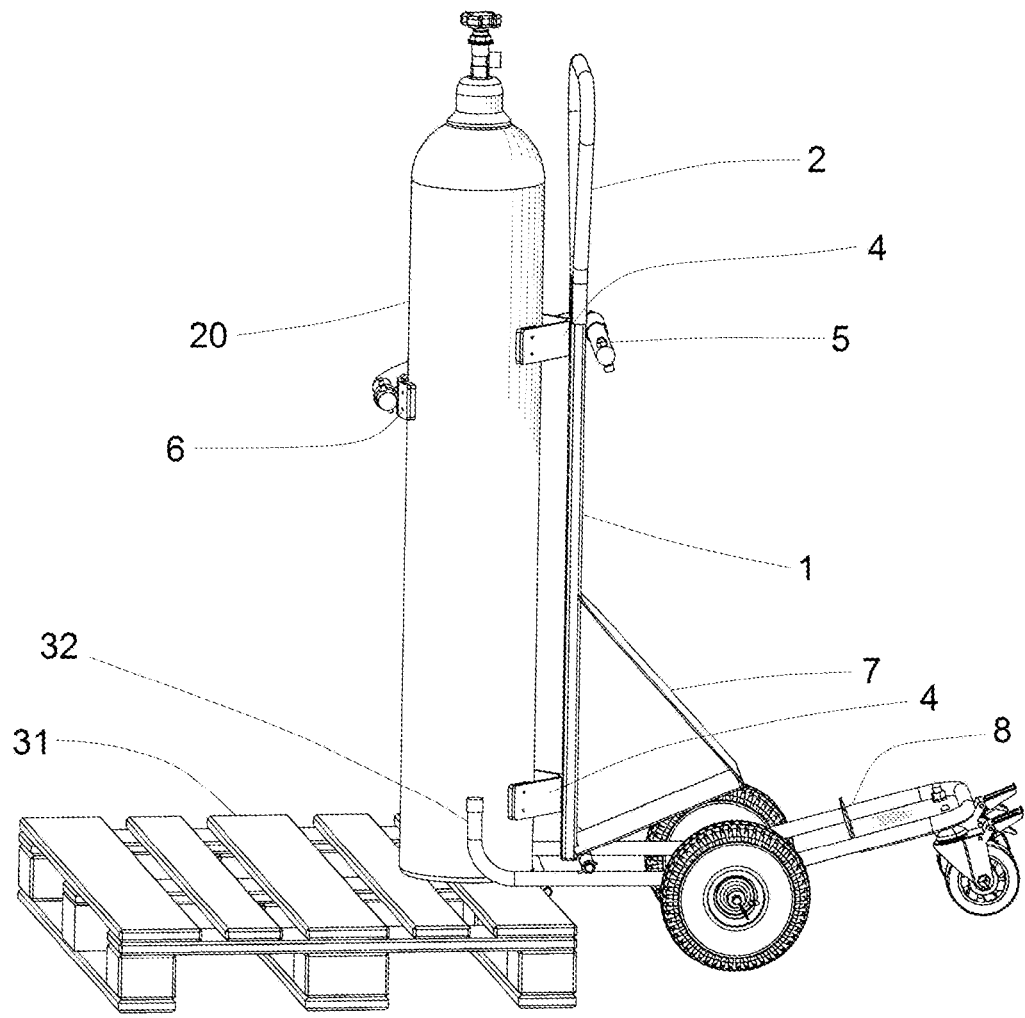
FIG. 3 shows a gas cylinder being held vertically on top of a wood pellet.
Figure 5:
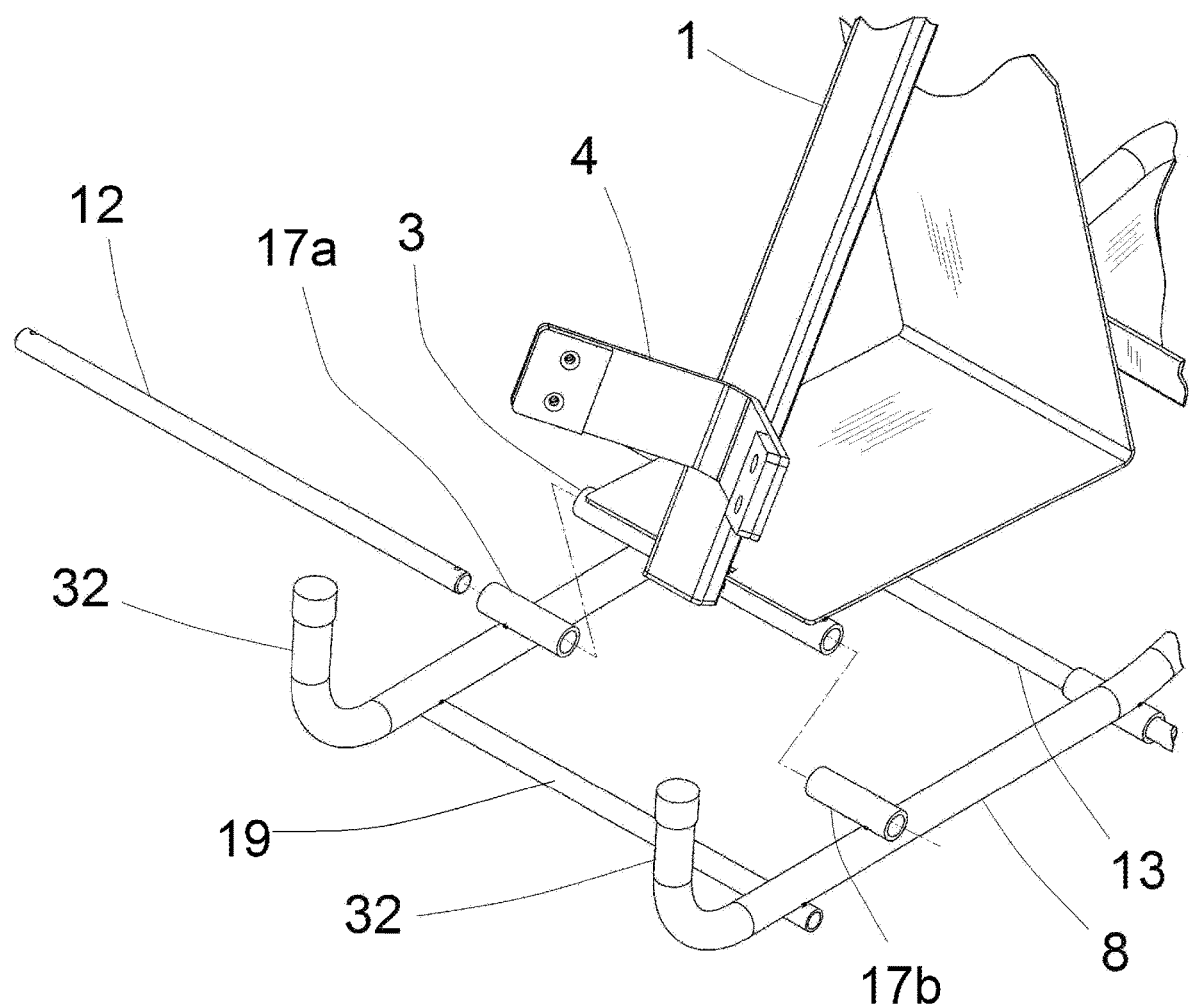
FIG. 5 shows the close-up exploded view of the way the long bar can rotate relative to the base frame.

As such, and reference FIG. 5 for the exploded view, long bar 1 can rotate about the shaft 12 to give the long bar 1 different standing angles. As shown in FIG. 3, if the long bar 1 is erected vertically, the bent portion of the metal plate 7 will not touch the base frame 8. In a resting, or unused, state, bent portion of the metal plate 7 will touch the base frame 8 and keep the long bar 1 at a slanting angle.

A v-shaped bracket 4 is located on an upper portion of the long bar 1; another v-shaped bracket 4 is located on a lower portion of the long bar 1.

A keeper bar 5 has one end rotatably connected to an upper point on the long bar 1. The keeper bar 5 has a center v-shaped bracket 6 on the other end. A short tube 14 is fixed, usually by welding, near an upper point on the long bar 1. The rotatable connection of the keeper bar 5 is made by sliding its upper end inside a short tube 14, thus making it slidable and rotatable inside the short tube 14.

The upper v-shaped bracket 4 and the lower v-shaped bracket 4 all have two friction pads 15. Similarly, the center v-shaped bracket 6 has two friction pads 16.

These friction pads 15 and 16 are on the two sides of the v-shaped brackets for contacting the outside surface of a gas cylinder 20 held by the lifting cart.

The friction pads 15/16 are made from materials with high coefficient of friction on metal to generate the desired friction contact between the pads 15 and 16 and a gas cylinder 20, sufficient to resist the gravitational pull by the weight of a cylinder 20 when held upright without support from the bottom. As such, even when holding a gas cylinder vertically, these friction pads 15/16 will be able to hold it tight in a way that the bottom of a gas cylinder does not need any support under it and the cylinder's bottom does not touch anything.

The gas cylinder lifting cart has two wheels 9 on the two sides of the two extending arms and at least one caster wheel 10 near the center of the U-shaped base frame 8 for easy swiveling, steering and turning. The caster wheel 10 further has a brake 11 for stoppage control, as well as addition safety.

The two wheels 9 can be pneumatic wheels to provide better maneuverability.

The drawings in FIGS. 1-4, though, show an embodiment of two caster wheels 10 evenly spaced at the U-tip of the base frame 8. In an embodiment of a single caster wheel 10, said caster wheel 10 would be placed at the center of the base frame 8.

Figure 4:
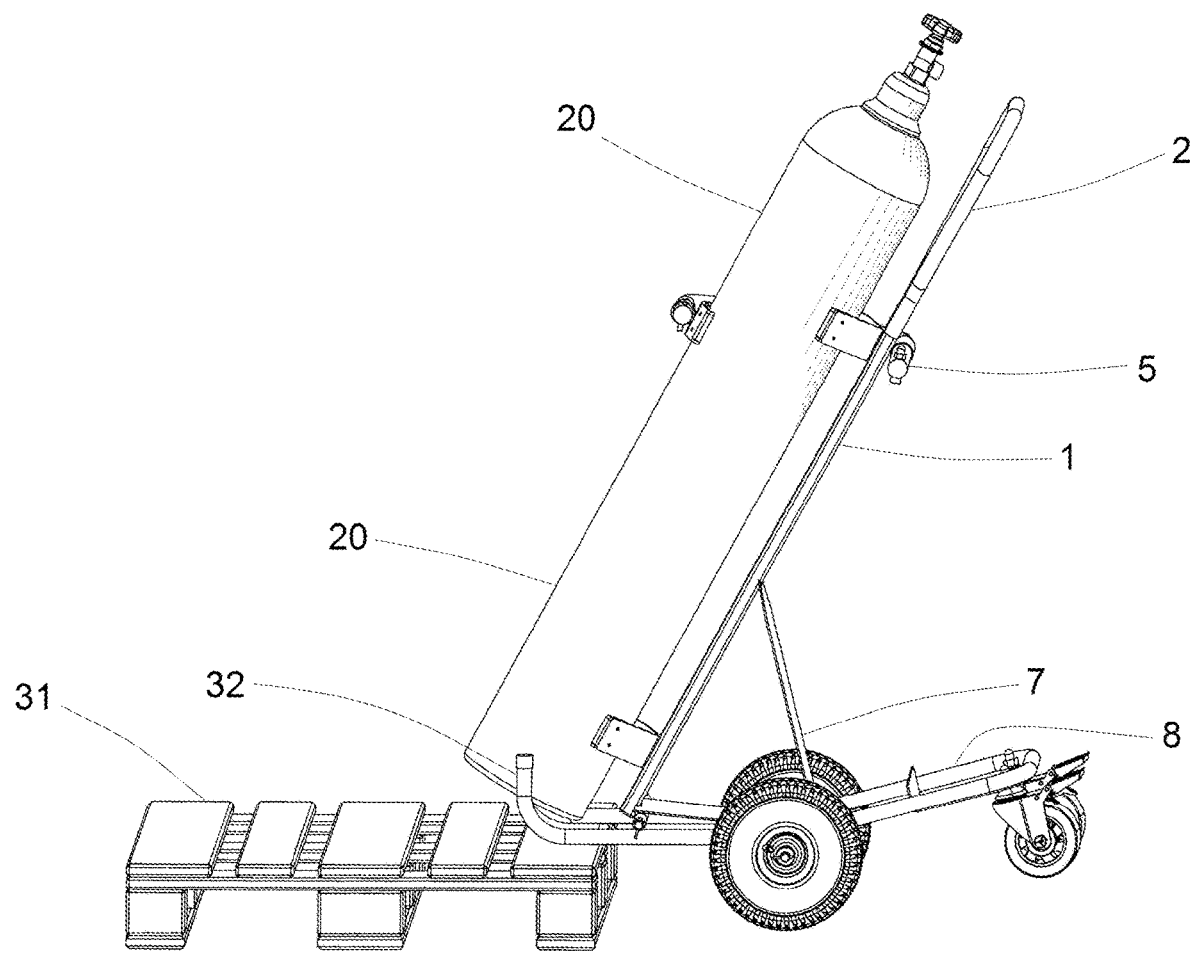
FIG. 4 shows a gas cylinder being transported, at an inclined angle, to a wood pellet. The bent upward angle of the base frame is also shown.

The base frame 8 is made to be bent upward at an angle, right about the middle of the two extending arms, as can be seen easily from FIGS. 3 and 4, to facilitate easy tilting a gas cylinder down to an inclined angle for transport.

The gas cylinder lifting cart further has a support bar 19 connecting the distal portion of the two extending arms. This support bar 19 provides further weight support for a gas cylinder even when the gas cylinder is not grabbed tightly by the keeper bar 5's friction pads 16 along with the pads 15 on the upper and lower v-shaped brackets 4. The support bar 19 serves more of a back-up function in the situation where the friction pads are not providing sufficient gripping power, either due to environment issues (temperature, moisture, etc.) or wear and tear.

Two front ends 32 are formed at the distal end of the two extending arms. The front ends 32 are bent at an angle, upwards in this embodiment, to avoid going into the gap or opening of a wooden pallet.

Although the term "metal" is used for the parts of the metal plate 7 and the metal tube 13, they can be made of non-metal materials as long as they provide the same structural to support the long bar 1, in the case of "metal plate" 7, and to allow the metal plate 7 to rest or mount on it strength, in the case of "metal tube" 13.

The invention claimed is:

1. A gas cylinder lifting cart, comprising
a base frame having a substantially U shape structure with two extending arms;
a metal or non-metal tube connecting the two extending arms in their middle portions;
a long bar having a handle on an upper distal end and a horizontal cylindrical tube at a lower distal end;
a shaft being received inside said cylindrical tube with its two ends received into a first tube and a second tube on the two extending arms;
a v-shaped bracket on an upper portion of the long bar and a v-shaped bracket on a lower portion of the long bar;
a keeper bar having one end rotatably connected to an upper point on the long bar and having a center v-shaped bracket on the other end; and
a metal or non-metal plate having a lower end connected to a lower distal end of the long bar and an upper end connected to a middle portion of the long bar, wherein the upper v-shaped bracket, the lower v-shaped bracket and the center v-shaped bracket all have two friction pads made on the two sides for contacting the outside surface of a gas cylinder held by the lifting cart.

2. The gas cylinder lifting cart of claim 1 further has two wheels on the two sides of the two extending arms and at least one caster wheel near the center of the base frame for easy steering and turning.

3. The gas cylinder lifting cart of claim 2 wherein the keeper bar is slidable and rotatable inside a short tube on an upper point of the long bar.

4. The gas cylinder lifting cart of claim 2 further has a support bar connecting the distal portion of the two extending arms.

5. The gas cylinder lifting cart of claim 2 wherein the at least one caster wheel has a brake for stoppage control.

6. The gas cylinder lifting cart of claim 2 further has two front ends that are bent at an angle to avoid going into the gap of a wood pallet.

7. The gas cylinder lifting cart of claim 2 wherein the base frame is made to be bent upward at an angle.

8. The gas cylinder lifting cart of claim 2 wherein the friction pads are made from materials with high coefficient of friction on metal to allow the friction contact between the pads and a gas cylinder to resist the gravitational pull by the weight of a cylinder when held upright without support from the bottom.

* * * * *